(12) United States Patent
Nasu et al.

(10) Patent No.: US 10,933,878 B2
(45) Date of Patent: Mar. 2, 2021

(54) DRIVE FORCE CONTROL SYSTEM

(71) Applicant: TOYOTA JIDOSHA KABUSHIKI KAISHA, Toyota (JP)

(72) Inventors: Takanobu Nasu, Sagamihara (JP); Hiroshi Isono, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/901,211

(22) Filed: Feb. 21, 2018

(65) Prior Publication Data

US 2018/0237015 A1 Aug. 23, 2018

(30) Foreign Application Priority Data

Feb. 21, 2017 (JP) .............................. JP2017-030462
Apr. 26, 2017 (JP) .............................. JP2017-086993

(51) Int. Cl.
*B60W 30/188* (2012.01)
*B60W 10/16* (2012.01)
*B60W 10/02* (2006.01)
*B60W 10/08* (2006.01)

(52) U.S. Cl.
CPC .......... *B60W 30/188* (2013.01); *B60W 10/02* (2013.01); *B60W 10/08* (2013.01); *B60W 10/16* (2013.01); *B60W 2710/027* (2013.01); *B60W 2710/083* (2013.01); *B60W 2720/406* (2013.01); *B60Y 2200/91* (2013.01); *Y02T 10/7275* (2013.01)

(58) Field of Classification Search
CPC ............... B60W 30/188; B60W 10/08; B60W 2710/083; B60W 2510/0657; B60W 10/02; B60W 10/16
See application file for complete search history.

(56) References Cited

U.S. PATENT DOCUMENTS

| | | | |
|---|---|---|---|
| 7,609,011 B2 | 10/2009 | Yatabe et al. | |
| 9,233,691 B2 * | 1/2016 | Tseng | B60W 30/19 |
| 9,522,612 B2 | 12/2016 | Spelta et al. | |
| 2014/0229043 A1 * | 8/2014 | Frank | B60W 20/20 |
| | | | 701/22 |
| 2014/0238766 A1 | 8/2014 | Hasuda et al. | |
| 2015/0057866 A1 * | 2/2015 | Tseng | B60W 30/19 |
| | | | 701/22 |

(Continued)

FOREIGN PATENT DOCUMENTS

| | | |
|---|---|---|
| CN | 204236461 U | 4/2015 |
| DE | 10 2009 055 160 A1 | 6/2011 |

(Continued)

*Primary Examiner* — Stacey A Fluhart
(74) *Attorney, Agent, or Firm* — Oliff PLC (57) ABSTRACT

A drive force control system to improve efficiency of a vehicle by controlling motors connected to drive wheels. A controller is configured to: calculate a total required torque of the drive unit; obtain combinations of a first interim torque of a first motor and a second interim torque of a second motor to achieve the total required torque; select a combination of the first interim torque and the second interim torque to minimize an output of a power source; and output the first interim torque of the first motor and the second interim torque of the second motor based on the selected combination.

1 Claim, 8 Drawing Sheets

(56) References Cited

U.S. PATENT DOCUMENTS

| | | | |
|---|---|---|---|
| 2015/0298574 A1* | 10/2015 | Bramson | B60L 15/2045 701/22 |
| 2016/0039405 A1 | 2/2016 | Terayama et al. | |
| 2016/0068159 A1 | 3/2016 | Zou | |
| 2017/0008422 A1 | 1/2017 | Honda | |
| 2017/0028872 A1 | 2/2017 | Fukudome | |
| 2017/0183008 A1 | 6/2017 | Isono et al. | |
| 2018/0141537 A1* | 5/2018 | Schobe | B60W 10/06 |
| 2018/0319635 A1* | 11/2018 | Hiekata | B66C 23/36 |

FOREIGN PATENT DOCUMENTS

| | | |
|---|---|---|
| DE | 10 2015 216 689 A1 | 3/2016 |
| EP | 2 484 571 A1 | 8/2012 |
| EP | 2769874 A2 | 8/2014 |
| JP | H07-039018 A | 2/1995 |
| JP | H09-093714 A | 4/1997 |
| JP | 2007-131108 A | 5/2007 |
| JP | 2011-188557 A | 9/2011 |
| JP | 2016-059269 A | 4/2016 |
| JP | 2017-118735 A | 6/2017 |
| WO | 2014/122562 A1 | 8/2014 |

* cited by examiner

DRIVE FORCE CONTROL SYSTEM

CROSS REFERENCE TO RELATED APPLICATION

The present invention claims the benefit of Japanese Patent Applications No. 2017-086993 filed on Apr. 26, 2017 and No. 2017-030462 filed on Feb. 21, 2017, with the Japanese Patent Office, the disclosures of which are incorporated herein by reference in its entirety.

BACKGROUND

Field of the Invention

Embodiments of the present disclosure relate to the art of a control system for controlling drive force of a vehicle in which a motor is individually connected to each drive wheel.

Discussion of the Related Art

JP-A-2011-188557 and US 2016/068159 A1 describe examples of a drive force control system in which a motor is individually connected to each drive wheel According to the teachings of JP-A-2011-188557, the motors connected to a pair of front wheels are operated as motors, and the motors connected to a pair of rear wheels are operated as generators. The motors are controlled in such a manner that a sum of a drive force established by the front wheels and a drive force (brake) established by rear wheels becomes equal to a drive force required by a vehicle.

In the vehicle taught by US 2016/068159 A1, a motor is individually connected to each of a left drive wheel and a right drive wheel, and a friction clutch is provided to enable a torque to be transmitted between these motors. The friction clutch has a torque transmitting capacity controlled depending on a road condition. According to the teachings of US 2016/068159 A1, a drive force control system determines whether to propel the vehicle with the drive force generated by one of the motors or to propel the vehicle with the drive force generated by the two motors depending on a road condition and a vehicle speed, and further determines whether each of the motors operates as a motor or a generator Specifically, the vehicle is propelled by the output power of a single motor to travel at a low vehicle speed under a suburban road condition, and is propelled by the output powers of the two motors to travel at a mid to high vehicle speed under the suburban road condition.

As described, according to the teachings of JP-A-2011-188557, one of the pairs of front and rear wheels establish the drive force, and the other pair of wheels establish the brake force. This results in a large slip amount between a road surface and one of the front wheels and the rear wheels, and the drive wheels may become worn. Such a large slip amount also results in a large power loss between the drive wheels and the road surface. As a result, acceleration of the vehicle with respect to a motor output may be reduced, even when the motor is operating at an optimum operating point. Thus, a power loss of the vehicle as a whole may be increased.

A motor serving as a prime mover of the vehicle can be more efficiently operated for generating a larger torque as long as the torque is smaller than a predetermined torque. In this context, the vehicle travelling at a low vehicle speed may be propelled by the output power of a single motor; as in the drive force control system for a vehicle described in US 2016/068159 A1, so that the motor can generate a large torque. As a result, the motor can operate at an optimum operating point, as compared with a case of propelling the vehicle by the output powers of two motors. However, the motor is less efficiently operated for generating a larger torque not smaller than the predetermined torque. Thus, the vehicle requires a large drive force, the efficiency may be lower in the case of propelling the vehicle by the output power of a single motor than in the case of propelling the vehicle by the output powers of two motors. Further even when the torque to be generated is smaller than the predetermined torque, the vehicle may be propelled in a more efficient manner with the two motors operated with one motor operating as a motor and the other motor operating as a generator Thus, the vehicle may not be propelled in an efficient manner with the motor to be operated inflexibly depending on the road condition and the torque transmitting capacity of the clutch inflexibly determined as taught by US 2016/068159 A1.

SUMMARY

Aspects of embodiments of the present application have been conceived noting the foregoing technical problems, and it is therefore an object of embodiments of the present disclosure is to provide a drive force control system configured to improve operating efficiency of a vehicle by controlling motors connected to drive wheels in an efficient manner.

The drive force control system is applied to a drive unit including, a first motor connected to a right drive wheel; a second motor connected to a left drive wheel; a clutch that allows a torque transmission between the first motor and the second motor in which a torque transmitting capacity is variable; and an electrical power source that supplies electric power to the first motor and the second motor. In order to achieve the above-explained objective, according to the embodiment of the present disclosure, the drive force control system is provided with a controller that controls output torques of the first motor and the second motor Specifically, the controller is configured to: calculate a total required torque of the drive unit; obtain a plurality of combinations of a first interim torque of the first motor and a second interim torque of the second motor to achieve the total required torque of the drive unit; select a combination of the first interim torque of the first motor and the second interim torque of the second motor to minimize an output electric power of the electrical power source; and output the first interim torque of the first motor and the second interim torque of the second motor based on the selected combination.

In a non-limiting embodiment, the controller is further configured to: control a torque transmitting capacity of the clutch; calculate a first required torque of the right drive wheel and a second required torque of the left drive wheel; calculate the a torque transmitting capacity of the clutch by subtracting the required torque of one of the drive wheels requiring a larger torque from the interim torque of the motor connected to the said one of the wheels of the selected combination, when the required torques of the drive wheels are different; and controls the clutch in such a manner as to achieve the calculated torque transmitting capacity.

According to the embodiment of the present disclosure, the torque can be transmitted between the first motor connected to the right wheel and the second motor connected to the left wheel via the clutch. In addition, the controller is configured to: obtain a plurality of combinations of the first interim torque of the first motor and the second interim torque of the second motor to achieve the total required torque of the drive unit; select the combination of the first interim torque of the first motor and the second interim torque of the second motor to minimize an output electric power of the electrical power source; and output the first interim torque of the first motor and the second interim torque of the second motor based on the selected combination. According to the embodiment, therefore, the drive unit will not output the torques excessively. That is, a slip amount of any of the wheels will not be increased. For this reason, damages on the wheels can be reduced, and a power loss between the wheel and a road surface can be reduced. In other words, a total efficiency of the vehicle can be improved.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Figure 1:
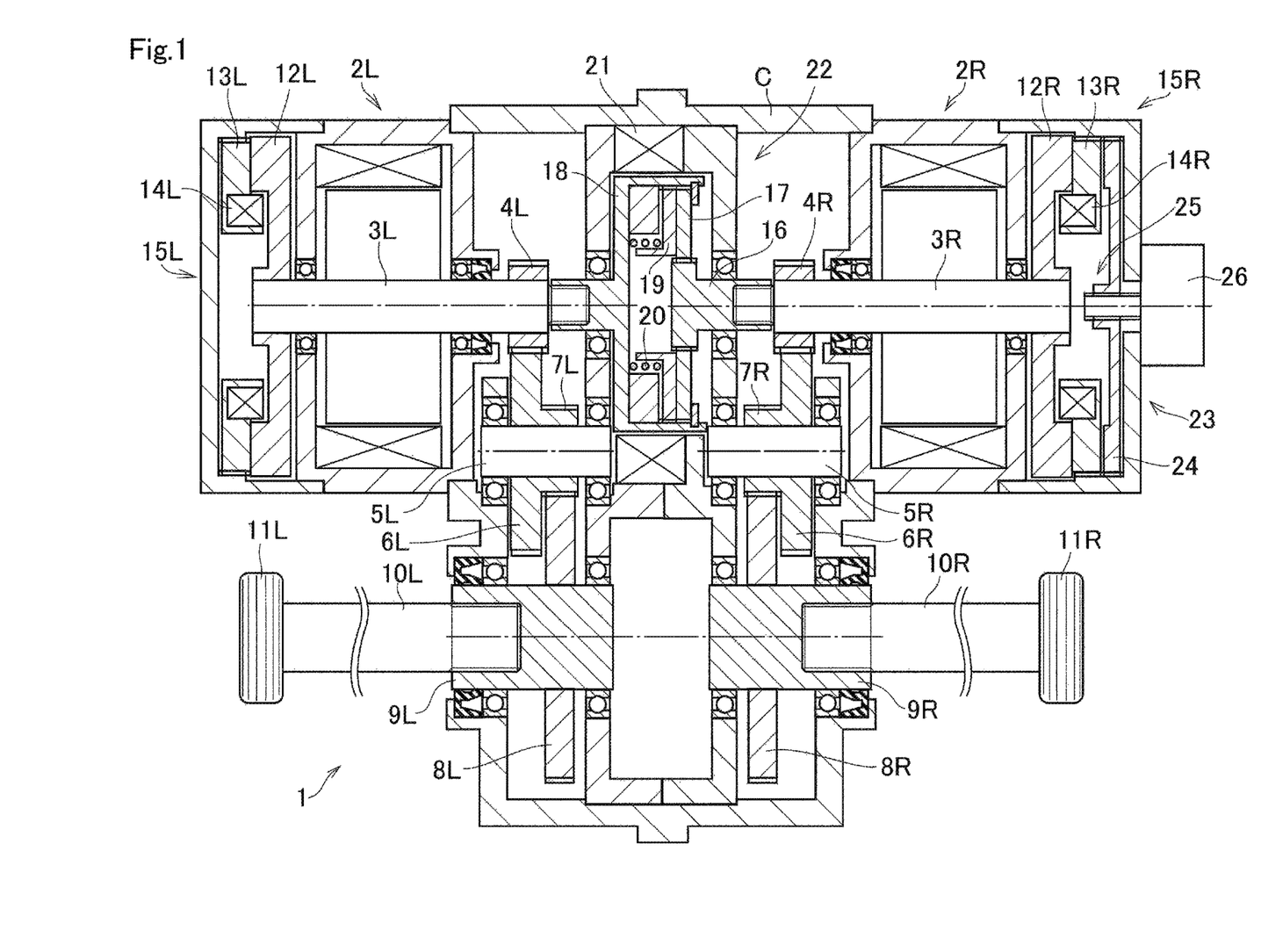
FIG. 1 is a cross-sectional view showing one example of a first drive unit having motors individually connected to each front wheel and a clutch that enables torque transmission between the motors.

A vehicle to which the control system according to the embodiment of the present disclosure is applied includes drive motors (to be simply referred to as motors hereinafter) and a clutch. The motors are connected to at least one of pairs of front wheels and rear wheels, and the clutch that selectively allows torque transmission between the motors. Turning now to FIG. 1, there is shown one example of a drive unit including the motor and the clutch according to the present disclosure. As can be seen from FIG. 1, a structure of the drive unit 1 is substantially symmetrical across a width center of the vehicle. In the following explanation, only a configuration on the right half in the figure will be explained, and an explanation for the left half will be omitted except for a configuration different from that of the right half. In FIG. 1, accordingly, the reference letter "R" designates members arranged in the right half of the drive unit 1, and the reference letters "L" designates members arranged in the left half of the drive unit 1. In the flowing explanation, the members in the right half of the drive unit 1 will be called the "first member", and the members in the left half of the drive unit 1 will be called the "second member" as necessary.

The drive unit 1 includes a motor 2 serving as a prime mover of a vehicle. For example, a motor-generator such as a permanent magnet synchronous motor may be used as the drive motor 2, as in the case of conventionally known motors serving as prime movers of hybrid vehicles and electric vehicles.

An output gear 4 is fitted onto a laterally inner end of an output shaft 3 of the motor 2 extending widthwise, and a countershaft 5 extends parallel to the output shaft 3. A counter driven gear 6 that is diametrically larger than the output gear 4 is fitted onto a laterally outer portion of the countershaft 5, and a pinion gear 7 that is diametrically smaller than the counter driven gear 6 is also fitted onto a laterally inner portion of the countershaft 5 to be meshed with a final reduction gear 8 that is diametrically larger than the pinion gear 7.

A cylindrical shaft 9 is inserted into the final reduction gear 8 about the rotational center thereof in such a manner as to protrude laterally outwardly while opening to laterally outside. A laterally inner end of a driveshaft 10 is splined into the opening of the cylindrical shaft 9, and a drive wheel 11 is attached to a laterally outer end of the driveshaft 10. In the following explanation, a gear ratio of a torque transmitting route between the motor 2 and the drive wheel 11.

A disc-shaped brake rotor 12 made of magnetic material is fitted onto a laterally outer end of the output shaft 3. An annular brake stator 13 faces the brake rotor 12. The brake stator 13 is splined into a casing C so that the brake stator 13 is allowed to move toward the brake rotor 12 but not allowed to rotate. The brake stator 13 is provided with a coil 14 so that the brake stator 13 is brought into contact to the brake rotor 12 by an electromagnetic force established by energizing the coil 14.

A brake torque is applied to the brake rotor 12 by frictionally contacting the brake stator 13 to the brake rotor 12. Thus, the brake stator 13, the brake rotor 12, and the coil 14 form a friction brake 15.

An extension shaft 16 is attached to the leading end of the first output shaft 3R closer to the width center of the vehicle than the first output gear 4R. An annular clutch disc 17 is fitted onto the extension shaft 16 to be rotated integrally therewith.

A bottomed-cylindrical cover shaft 18 holding the clutch disc 17 in a hollow space is attached to the leading end of the second output shaft 3L closer to the width center of the vehicle than the second output gear 4L.

An annular pressure plate 19 is interposed between a bottom face of the cover shaft 18 and the clutch disc 17. The pressure plate 19 is made of magnetic material, and is splined into the cover shaft 18 to be rotated integrally with the cover shaft 18 while being allowed to move in the axial direction of the cover shaft 18.

A spring 20 is interposed between the bottom face of the cover shaft 18 and the pressure plate 19 to push the pressure plate 19 toward the clutch disc 17.

A coil 21 is provided on the outer side of the cover shaft 18. The coil 21 generates an electromagnetic force upon being energized, so that the pressure plate 19 is isolated away from the clutch disc 17 against a spring force of the spring 20.

The clutch disc 17, the pressure plate 19, the spring 20, and the coil 21 form an electromagnetic clutch (to be simply referred to as a clutch hereinafter) 22. When the coil 21 is not energized, the clutch disc 17 and the pressure plate 19 are contacted to each other by the spring force of the spring 20 to be rotated integrally. When the coil 21 is energized, a torque transmitting capacity between the clutch disc 17 and the pressure plate 19 is set in accordance with the electric power applied to the coil 21.

Thus, the first motor 2R and the second motor 2L can be rotated integrally while transmitting a torque therebetween by frictionally engaging the pressure plate 19 and the clutch disc 17 without energizing the coil 21. A torque transmitting capacity between the pressure plate 19 and the clutch disc 17 can be reduced by energizing the coil 21. As a result, the first motor 2R and the second motor 2L rotate relatively to each other; whereby a torque transmitted between the first motor 2R and the second motor 2L can be reduced.

The brake torque applied to the drive wheels 11R and 11L cannot be maintained when the power is off to park the vehicle. In order to maintain a frictional contact between the first brake rotor 12R and the first brake stator 13R thereby halting the drive wheels 11R and 11L even when the power is off, the drive unit 1 is provided with a parking lock device 23. Specifically, the parking lock device 23 comprises an annular movable plate 24 opposed to the first brake rotor 12R across the first brake stator 13R, a feed screw mechanism 25, and a brake motor 26 that actuates the feed screw mechanism 25.

The feed screw mechanism 25 is adapted to translate a rotary motion of the brake motor 26 into a linear motion thereby pushing the movable plate 24 toward the first brake stator 13R so as to bring the first brake stator 13R into frictional contact to the first brake rotor 12R. That is, the feed screw mechanism 25 keeps the first output shaft 3R stopping even if current supply to the brake device 8 is interrupted. Thus, the feed screw mechanism 25 generates forward thrust force by generating forward torque by the brake motor 26, and the forward thrust force is applied to the first brake stator 13R. Consequently, the first brake stator 13R is frictionally engaged with the first brake rotor 12R to halt the first output shaft 3R. By contrast, the first output shaft 3R is allowed to rotate by generating a reverse torque by the brake motor 26 to withdraw the first brake stator 13R from the first brake rotor 12R. That is, the brake force for stopping the rotation of the first output shaft 3R is cancelled.

Specifically, reversed efficiency of the feed screw mechanism 25 to translate the linear motion into the rotational motion is adjusted to be lower than forward efficiency to translate the rotational motion into the linear motion. According to an embodiment, therefore, the first output shaft 3R may be halted by pushing the movable plate 24 and the first brake stator 13R toward the first brake rotor 12R by the feed screw mechanism 25. Therefore, the first output shaft 3R may be halted by the parking lock device 23 even if the current supply to the first coil 14R and the brake motor 26 is stopped while the feed screw mechanism 25 is operated by the brake motor 26 and the first output shaft 3R is halted.

Thus, when the vehicle is parked, the current supply to the coil 21 is stopped and hence the clutch 22 is brought into engagement. In this situation, therefore, rotation of the second output shaft 3L is also stopped by stopping the rotation of the first output shaft 3R by the parking lock device 23. In other words, the brake torques applied to the drive wheels 11R and 11L can be maintained. The parking lock device 23 may be arranged in such a manner as to stop the rotation of the second output shaft 3L, or may be arranged in such a manner as to stop the rotation of the first countershaft 5R instead of the first output shaft 3R, for example.

As described, in the drive unit 1, the right and the left drive wheels 11R and 11L may be rotated integrally to propel the vehicle by engaging the clutch 22 completely to apply the same torques to the right and the left drive wheels 11R and 11L. For example, the vehicle can be propelled by a torque generated by at least one of the first motor 2R and the second motor 2L. In this case, the torque generated by one of the first motor 2R and the second motor 2L may be regenerated partially by the other one of the motors. Further one of the first motor 2R and the second motor 2L can generate a large torque, and the other one of the motors can generate a torque in an amount corresponding to the shortage. Thus, output torques of the motors 2R and 2L can be adjusted as appropriate.

When the right and the left drive wheels 11R and 11L are rotated relative to each other during turning or the other like occasions, or when differentiating torques transmitted to the right and the left drive wheels 11R and 11L, the vehicle can be propelled by generating a torque by at least one of the motors 2R and 2L while causing a slip in the clutch 22. Further, the vehicle can be propelled by generating the drive torque by one of the motors 2R and 2L while regenerating part of the drive torque by the other one of the motors 2R and 2L. For this purpose, the output torques of the motors 2R and 2L can be adjusted as appropriate.

When a speed difference or a torque difference between the right and the left drive wheels 11R and 11L is equal to or larger than a predetermined value, the outputs of the right and the left drive wheels 11R and 11L may be appropriately adjusted by completely disengaging the clutch 22. In this situation, the motor 2R (2L) connected to the outer wheel may be operated as a motor and the motor 2R (2L) connected to the inner wheel may be operated as a generator Instead, only the motor 2R (2L) connected to the outer wheel may be operated to generate a torque.

Figure 2:
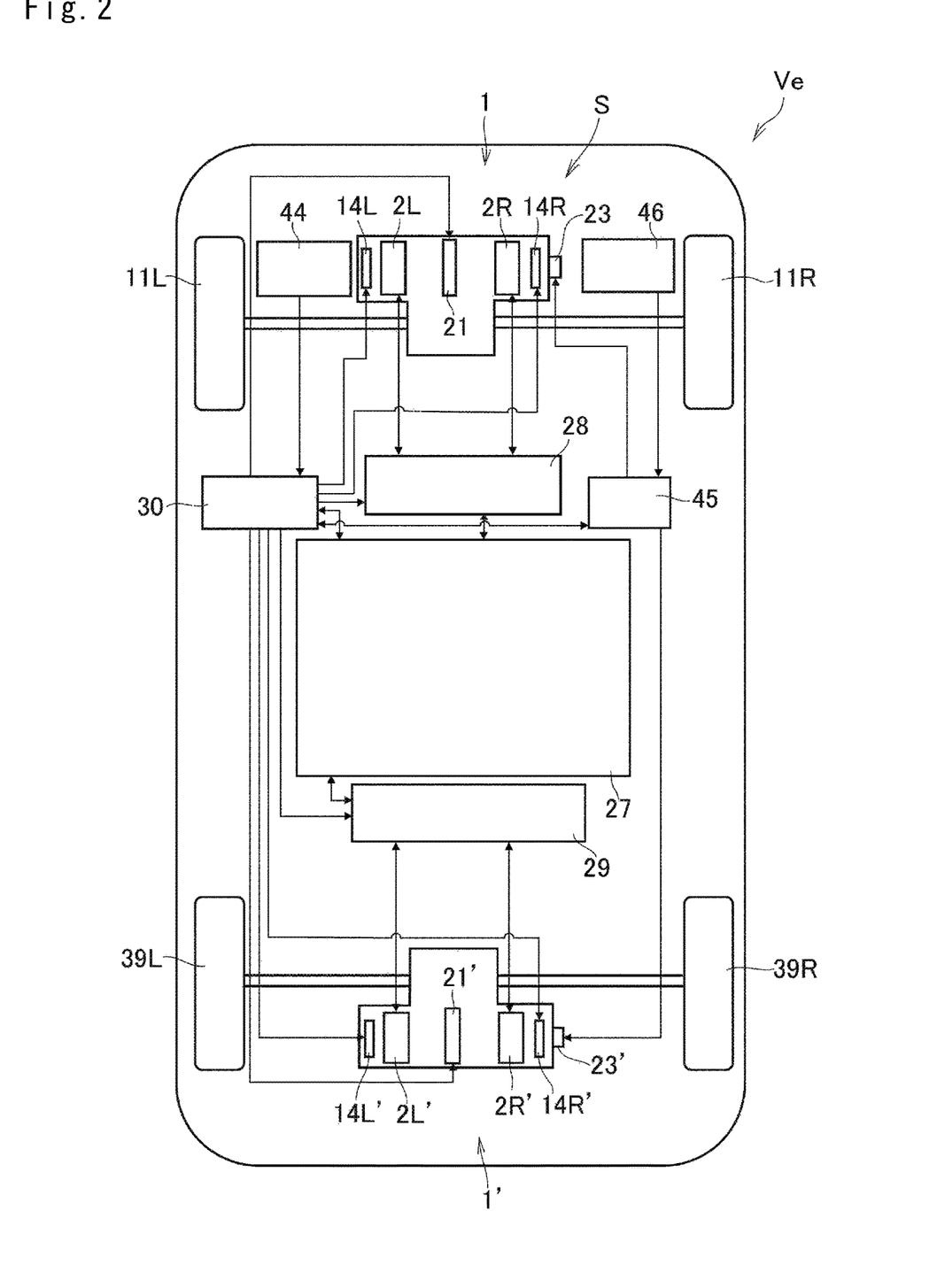
FIG. 2 is a schematic illustration showing one example of a vehicle to which the control system according to the embodiment is applied.

Next, an example of a configuration of a control system S for a vehicle Ve including the drive unit 1 described above will be described. FIG. 2 is a diagram schematically showing an example of the configuration of the system. As illustrated in FIG. 2, the vehicle Ve is a four wheel drive (4WD) layout vehicle in which a first drive unit 1 is arranged in the front side of the vehicle Ve and a second drive unit 1' is arranged in the rear side of the vehicle Ve substantially symmetrical across the longitudinal center of the vehicle Ve. In the flowing explanation, the members of the second drive unit 1' with the same configuration as the members (including the first motor 2R) provided in a torque transmission path between the first motor 2R and the right drive wheel 11R in the first drive unit 1 will be called the "third member". The members of the first drive unit 1 with the same configuration as the members (including the second motor 2L) provided in a torque transmission path between the second motor 2L and the left drive wheel 11L in the first drive unit 1 will be called the "fourth member". The clutch and the parking lock device in the second drive unit 1', as well as the members of these, will be called a "second clutch", a "second parking lock device", and the "second member". The apostrophe on the reference numeral designates members of the second drive unit 1', for the distinction from the members of the first drive unit 1.

In the first drive unit 1, the first motor 2R, the second motor 2L, and the coils 14R, 14L, and 21 receive electric power from a high-voltage power storage device 27 including a battery and a capacitor, as a conventional power storage device used in hybrid vehicles and electric vehicles. Likewise, in the second drive unit 1', the first motor 2R', the second motor 2L', and the coils 14R', 14L', and 21' also receive the electric power from the power storage device 27. The power storage device 27 is charged with the power generated by the motors 2R, 2L, 2R', and 2L'. The power storage device 27 serves as an "electrical power source" in the embodiment.

A first inverter 28 is interposed between the power storage device 27 and the motors 2R and 2L, and the first inverter 28 is adapted to switch between direct current and alternate current, and to control values and frequencies of current supplied to the motors 2R and 2L. The second drive unit 1' is also provided with a second inverter 29 that can control a value and a frequency of the current supplied to the motors 2R' and 21'.

Figure 3:
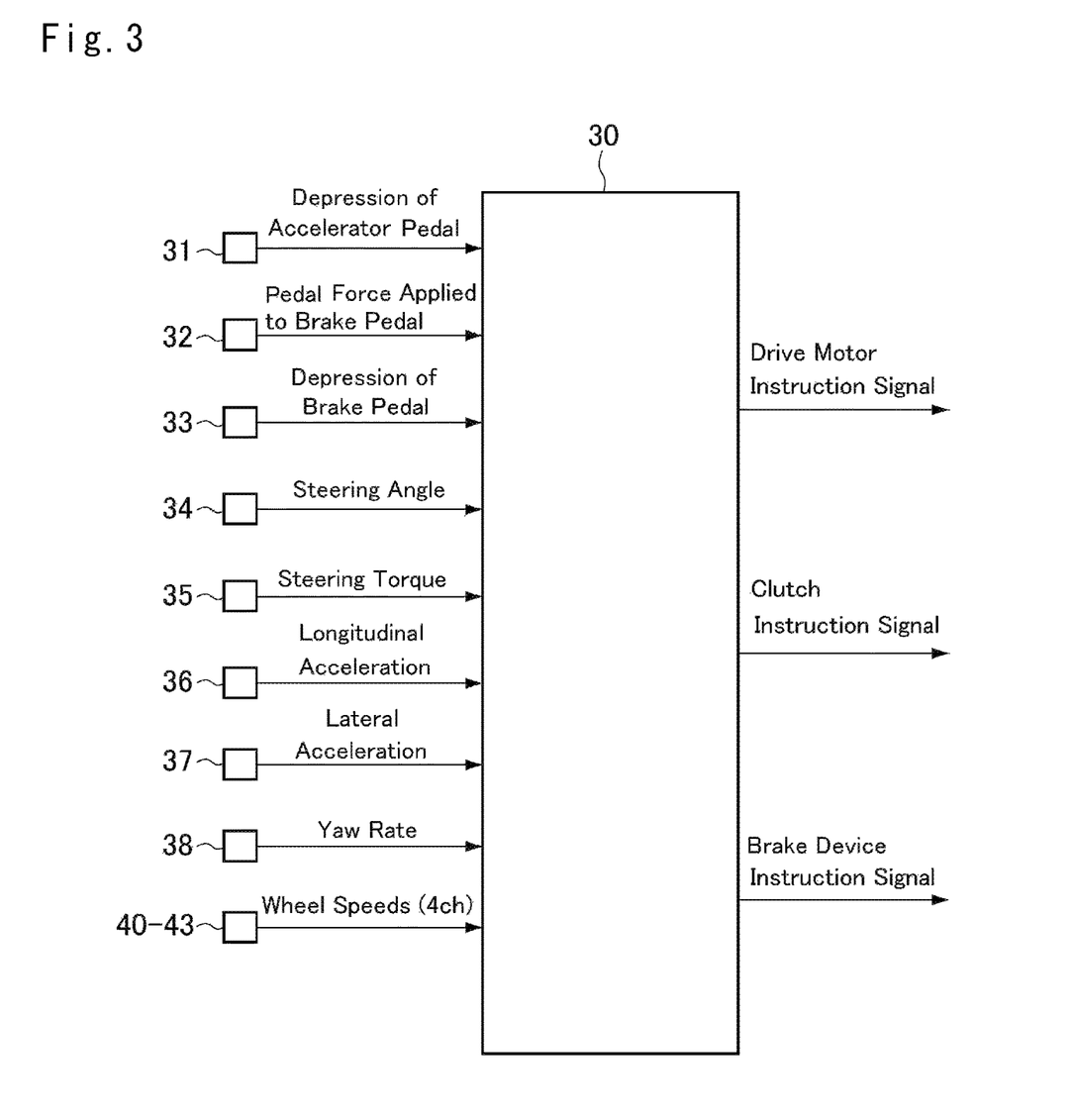
FIG. 3 is a block diagram showing functions of a first ECU.

A first electronic control unit 30 (to be abbreviated as the "first ECU" hereinafter) is provided to control the motors 2R and 2L and the coils 14R, 14L, and 21 of the first drive unit 1, as well as the motors 2R' and 2L' and the coils 14R', 14L', and 21' of the second drive unit 1'. The first ECU 30 as a "controller" of the embodiment mainly includes a microcomputer as in any known ECUs installed in vehicles. FIG. 3 is a block diagram illustrating functions of the first ECU 30.

Signals representing posture of the vehicle Ve and operating conditions are sent to the first ECU 30, and the first ECU 30 transmits control signal to the first inverter 28 and the second inverter 29 based on the incident signals, preinstalled formulas and maps, and the like. The control signals, sent from the first ECU 30 to the first inverter 28 and the second inverter 29, are obtained while taking account of conventionally known Antilock Brake system (ABS), Traction Control (TRC), Electronic Stability Control (ESC), Dynamic Yaw rate Control (DYC), and the like.

For example, the first ECU 30 receives signals from an accelerator sensor 31 that detects a depression of an accelerator pedal, a first brake pedal sensor 32 that detects a pedal force applied to the brake pedal, a second brake pedal sensor 33 that detects a depression of the brake pedal, a steering angle sensor 34 that detects a steering angle, and a torque sensor 35 that detects a steering torque. For example, the first ECU 30 also receives signals representing data about the posture of the vehicle Ve, from a first G sensor 36 that detects longitudinal acceleration of the vehicle Ve, a second G sensor 37 that detects lateral acceleration of the vehicle Ve, a yaw rate sensor 38 that detects a yaw rate of the vehicle Ve, and wheel speed sensors 40, 41, 42, and 43 that respectively detect rim speeds of the right front wheel 11R, the left front wheel 11L, the right rear wheel 39R, and the left rear wheel 39L.

A first auxiliary battery 44 is provided to supply power for operating the first ECU 30 and for controlling a transistor (not illustrated) installed in the first inverter 28. The first auxiliary battery 44 is set to be at a lower voltage than the power storage device 27.

Figure 4:
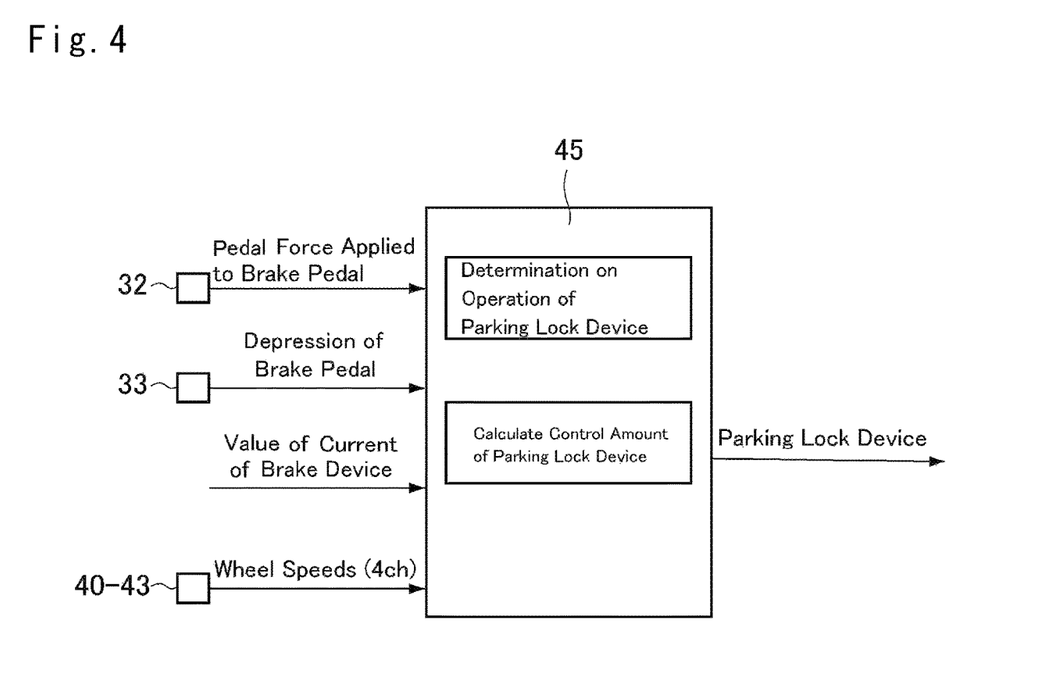
FIG. 4 is a block diagram showing functions of a second ECU.

Preferably, the parking lock device 23 may be controlled in the event of failure of electric system between the first ECU 30 and the first auxiliary battery 44 resulting in failure to power supply to the coils 14R, 14L, and 21, and in the event of failure of electric system between the power storage device 27 and the first inverter 28. To this end, in the example illustrated in FIG. 2, a second ECU 45 is provided independently from the first ECU 30. The second ECU 45 is electrically connected to the parking lock devices 23 and 23' (specifically, the brake motors 26 and 26'). The second ECU 45 mainly includes a microcomputer as in the case of the first ECU 30. FIG. 4 is a block diagram illustrating the configuration of the second ECU 45.

Signals representing posture of the vehicle Ve and operating conditions are sent to the second ECU 45. The second ECU 45 is configured to determine whether or not to operate each of the parking lock devices 23 and 23' based on the incident signals, preinstalled formulas and maps, and the like. The second ECU 45 determines a control amount for each of the parking lock devices 23 and 23' through calculations or the like, and outputs a control signal to each of the parking lock devices 23 and 23' based on the control amount thus determined.

For example, the second ECU 45 receives signals from sensors (not illustrated) that detect values of current supplied to the first brake pedal sensor 32, the second brake pedal sensor 33, and the friction brakes 15R, 15L, 15R', and 15L', and receives signals representing data about the posture of the vehicle Ve from the wheel speed sensors 40, 41, 42, and 43. A condition to operate each of the parking lock devices 23 and 23' is satisfied based upon satisfaction of at least one of the following conditions. Specifically, the conditions to operate each of the parking lock devices 23 and 23' is satisfied when the vehicle has been parked for a predetermined period of time, when a switch to operate each of the brake motors 26 and 26' is turned ON, when the vehicle has been parked while the ignition key is turned OFF, and when at least one of the friction brakes 15R, 15L, 15R', and 15L' cannot operate.

The brake torques of the parking lock devices 23 and 23' are obtained based on the pedal force and the depression of the brake pedal and the wheel speed of each of the drive wheels 11R, 11L, 39R, and 39L, and current for achieving such brake torques is supplied to the brake motors 26 and 26'. A second auxiliary battery 46 is provided to supply power for operating the second ECU 45 and for controlling the parking lock devices 23 and 23'. The second ECU 45 may be configured to receive the signals supposed to be sent to the first ECU 30, and to operate in the event of failure of the first ECU 30.

In the first drive unit 1, combination of the operating points (i.e., torques) of the first motor 2R and the second motor 2L to achieve the required torques of the drive wheels 11R and 11L may be selected form a plurality of choices. Likewise, in the second drive unit 1', combination of the operating points (i.e., torques) of the motor 2R' and the motor 2E to achieve a required torque of the of the drive wheels 39R and 39L may also be selected form a plurality of choices. Hereinafter, a procedure to set the operating points of the first motor 2R and the second motor 2L of the first drive unit 1 will be explained. The operating points of the motors 2R' and 2E of the second drive unit 1' may also be set by the same procedure.

In the drive unit 1, an operating mode may be selected from first to fourth mode. In the first mode, the first motor 2R and the second motor 2L generate torques equally achieve a required torque $T_{req}$ to propel the vehicle in the straight line. In the second mode, one of the first motor 2R and the second motor 2L generates the required torque $T_{req}$ to propel the vehicle without generating a torque by the other motor. In the third mode, one of the first motor 2R and the second motor 2L generates a torque smaller than the required torque $T_{req}$ but greater than a half of the required torque $T_{req}/2$, and the other motor generates a shortage of the torque. In the fourth mode, one of the first motor 2R and the second motor 2L generate a torque greater than the required torque $T_{req}$, and the other motor translates redundant torque into an electric power. In the third mode and the fourth mode, the output torque of one of the motors 2R and 2L can be adjusted as appropriate.

Figure 5:
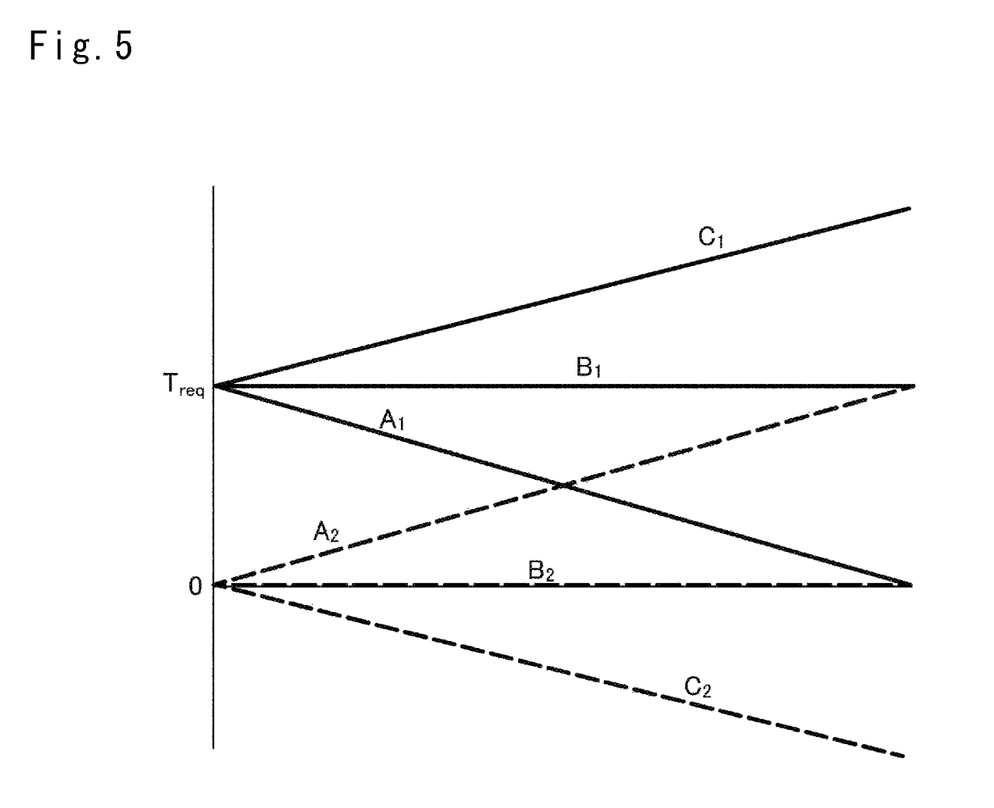
FIG. 5 is a graph schematically showing a relation between operating points of the motors to achieve a required torque of the first drive unit.

Relations between the operating points of the first motor 2R and the second motor 2L in each mode are schematically shown in FIG. 5. In FIG. 5, the solid line represents a torque of the first motor 2R, and the dashed line represents a torque of the second motor 2L. In the first mode, the first motor 2R is controlled in such a manner that the torque of the second motor 2L can be reduced to zero. In the second mode, the first motor 2R and the second motor 2L are controlled at an intersection between the solid line A1 and the dashed line A2. In the third mode, the torque of the second motor 2L is increased as indicated by the dashed line A2 to achieve the required torque $T_{req}$ with a reduction in the torque of the first motor 2R from the required torque $T_{req}$ as indicated by the solid line A1. In the fourth mode, the torque of the second motor 2L is decreased to increase a regeneration amount as indicated by the dashed line C2 with an increase in the torque of the first motor 2R from the required torque $T_{req}$ as indicated by the solid line C1.

An operating efficiency of each of the first motor 2R and the second motor 2L is changed individually depending on the operating point governed by a rotational speed and a torque. Specifically, such operating efficiency may be calculated by dividing an output power of the motor by an input electric power to the motor. However, even if one of the first motor 2R and the second motor 2L is operated at an efficient point, a total efficiency X of the first drive unit 1 may be reduced if the other motor is operated at an in efficient point. Consequently, an output power of the first drive unit 1 may be reduced with respect to an output electric power of the first power storage device 27.

In order to avoid such reduction in the output power of the first drive unit 1, the drive force control system according to the embodiment is configured to control the torques of the first motor 2R and the second motor 2L in such a manner as to achieve the required torque of the first drive unit 1 while improving the total efficiency X of the first drive unit 1.

To this end, first of all, a combination of the first motor 2R and the second motor 2L possible to achieve the required torque $T_{req}$ of the first drive unit 1 is selected. Specifically, a plurality of first interim torques $T1_{pr}$ are set by changing the torque of the first motor 2R from a minimum torque (e.g., from −200 Nm) to a maximum torque (e.g., to 200 Nm) by a predetermined value (e.g., by 1 Nm). By thus changing the torque of the first motor 2R from the minimum torque by the predetermined torque, the interim torque $T1_{pr}$ may be set appropriately even if the specification of the second motor 2L is different.

Then, a plurality of second interim torques $T2_{pr}$ to achieve the required torque $T_{req}$ of the first drive unit 1 are set by changing the torque of the second motor 2L by a predetermined value. Combinations of the first interim torque $T1_{pr}$ and the second interim torque $T2_{pr}$ to achieve the required torque $T_{req}$ of the first drive unit 1 will be explained hereinafter. In order to achieve the required torque $T_{req}$ of e.g., 100 Nm, if the first interim torque $T1_{pr}$ is 0 Nm, the second interim torque $T2_{pr}$ is set to 100 Nm. In this case, if the first interim torque $T1_{pr}$ is 80 Nm, the second interim torque $T2_{pr}$ is set to 20 Nm, and if the first interim torque $T1_{pr}$ is 170 Nm, the second interim torque $T2_{pr}$ is set to −70 Nm. Thus, the required torque $T_{req}$ of the first drive unit 1 is a total torque of the first motor 2R and the second motor 2L.

Thereafter, the total efficiency X of the first drive unit 1 is calculated for every combination of the first interim torque $T1_{pr}$ and the second interim torque $T2_{pr}$ to achieve the required torque $T_{req}$, by the following formula:

$$X = (T_{req} \cdot N_{am}) / ((T1_{pr}/\eta 1) \cdot {}^* N1_m + (T2_{pr}/\eta 2) \cdot N2_m)$$

where $N1_m$ is a rotational speed of the first motor 2R, $N2_m$ is a rotational speed of the second motor 2L, $N_{am}$ is an average value of the rotational speed $N1_m$ of the first motor 2R and the rotational speed $N2_m$ of the second motor 2L, $\eta 1$ is an efficiency based on the operating point of the first motor 2R, and $\eta 2$ is an efficiency based on the operating point of the second motor 2L. The rotational speeds $N1_m$ and $N2_m$ may be detected by motor speed sensors or by the wheel speed sensors 40 and 41. The efficiencies $\eta 1$ and $\eta 2$ at every operating point of the first motor 2R and the second motor 2L are stored in the first ECU 30. Thus, in the above formula, the output power of the first drive unit 1 is divided by the output electric power of the first power storage device 27 as a required energy amount to achieve the required torque $T_{req}$ of the first drive unit 1.

For example, given that the required torque $T_{req}$ of the first drive unit 1 is 100 Nm, the rotational speed of each of the first motor 2R and the second motor 2L is 2000 rpm (that is, during propulsion in the straight line), the first interim torque $T1_{pr}$ is 120 Nm, the second interim torque $T2_{pr}$ is −20 Nm, the efficiency of the first motor 2R to generate a torque of 120 Nm at 2000 rpm is 0.98%, the efficiency of the second motor 2L to generate a torque of −20 Nm at 2000 rpm is 0.94%, the total efficiency X of the first drive unit 1 is expressed as:

$$X = (100 \cdot 2000) / ((120 / 0.98) \cdot 0.2000 + (-20 / 0.94) \cdot 0.2000).$$

In this case, the total efficiency X of the first drive unit 1 is 0.988%.

During turning, the torques of the drive wheels 11R and 11L are differentiated. For example, if the required torque of the right front wheel 11R is larger than the left front wheel 11L, the total efficiency X of the first drive unit 1 is calculated by increasing the first interim torque $T1_{pr}$ of the first motor 2R connected to the right front wheel 11R larger than the required torque of the right front wheel 11R. In this case, the torque is transmitted from the first motor 2R generating a larger torque through the clutch 22 to the drive wheel 11L connected to the second motor 2L generating a smaller torque. In this case, therefore, the first interim torque $T1_{pr}$ of the first motor 2R is increased larger than the required torque of the right front wheel 11R as an outer wheel during turning.

After thus calculating the total efficiency X of the first drive unit 1, a torque transmitting capacity $TC_{tr}$ of the clutch 22 is calculated based on a difference the first interim torque $T1_{pr}$ of the first motor 2R connected to the right front wheel 11R and the required torque of the right front wheel 11R. That is, the torque transmitting capacity $TC_{tr}$ of the clutch 22 is calculated in such a manner as to reduce the torque transmitted to the outer wheel while increasing the torque transmitted to the inner wheel.

For example, given that the required torque $T_{req}$ of the first drive unit 1 is 100 Nm, the required torque of the right front wheel 11R is 70 Nm, and the first interim torque $T1_{pr}$ is set to 120 Nm and the second interim torque $T2_{pr}$ is set to −20 Nm to maximize the total efficiency X of the first drive unit 1, the torque transmitting capacity $TC_{tr}$ of the clutch 22 is 50 (=120−70).

Thus, the total efficiency X of the first drive unit 1 is calculated for every combination of the first interim torque $T1_{pr}$ and the second interim torque $T2_{pr}$ to achieve the required torque $T_{req}$. Then, the combination of the first interim torque $T1_{pr}$ and the second interim torque $T2_{pr}$ is selected in such a manner as to optimize the total efficiency X of the first drive unit 1, that is, to minimize the output electric power of the first power storage device 27. Thereafter, the first interim torque $T1_{pr}$ and the second interim torque $T2_{pr}$ of such combination are employed as a target torque $T1_{ta}$ of the first motor 2R and a target torque $T2_{ta}$ of the second motor 2L. When the required torques of the drive wheels 11R and 11L are different during turning, the torque transmitting capacity $TC_{tr}$ of the clutch 22 is calculated by subtracting the required torque of the outer wheel from the interim torque of the motor connected to the outer wheel.

The target torque $T1_{ta}$ of the first motor 2R, the target torque $T2_{ta}$ of the second motor 2L, and the torque transmitting capacity $TC_{tr}$ of the clutch 22 may be calculated continuously. Alternatively, combinations of the target torque $T1_{ta}$, the target torque $T2_{ta}$, and the torque transmitting capacity $TC_{tr}$ to achieve the required torque $T_{req}$ of the first drive unit 1 and the required torque of the outer wheel may also be stored in the form of map.

Figure 6:
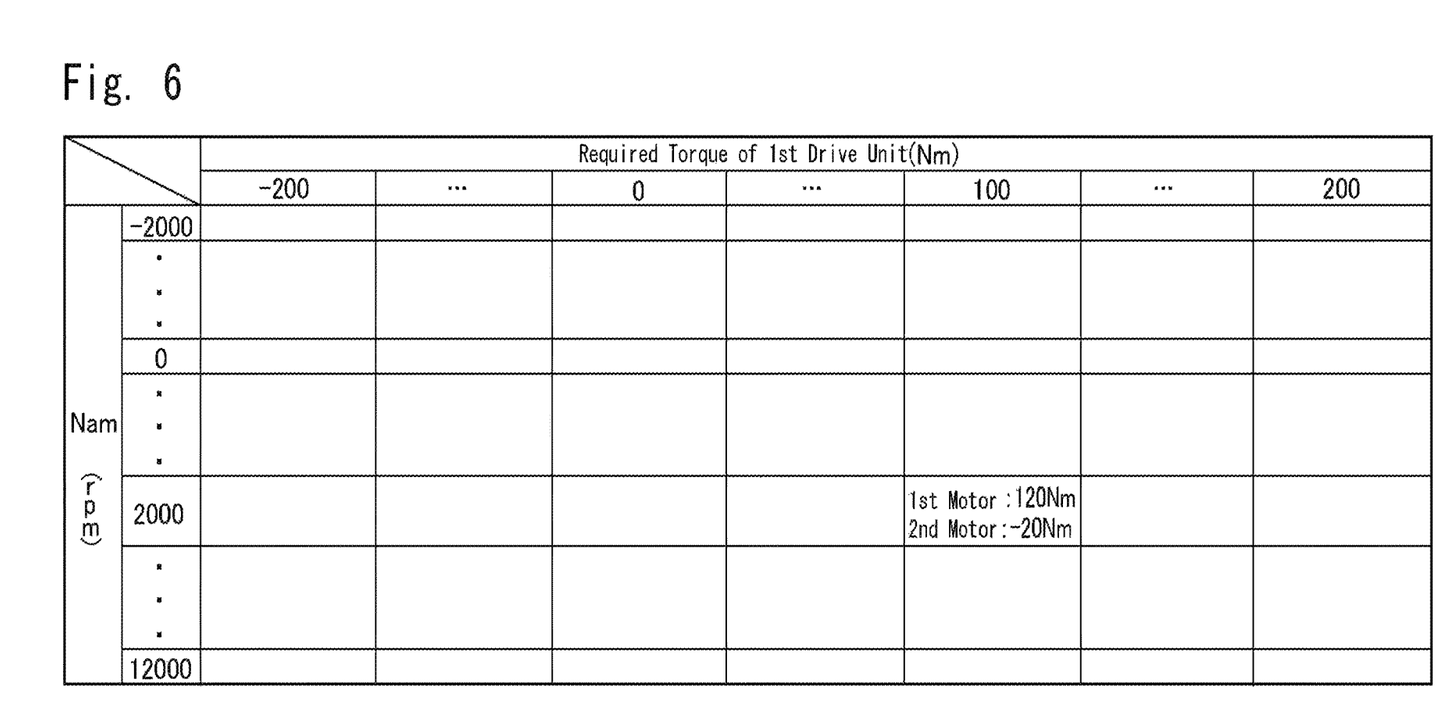
FIG. 6 shows a map used to propel the vehicle in a straight line.
Figure 7:
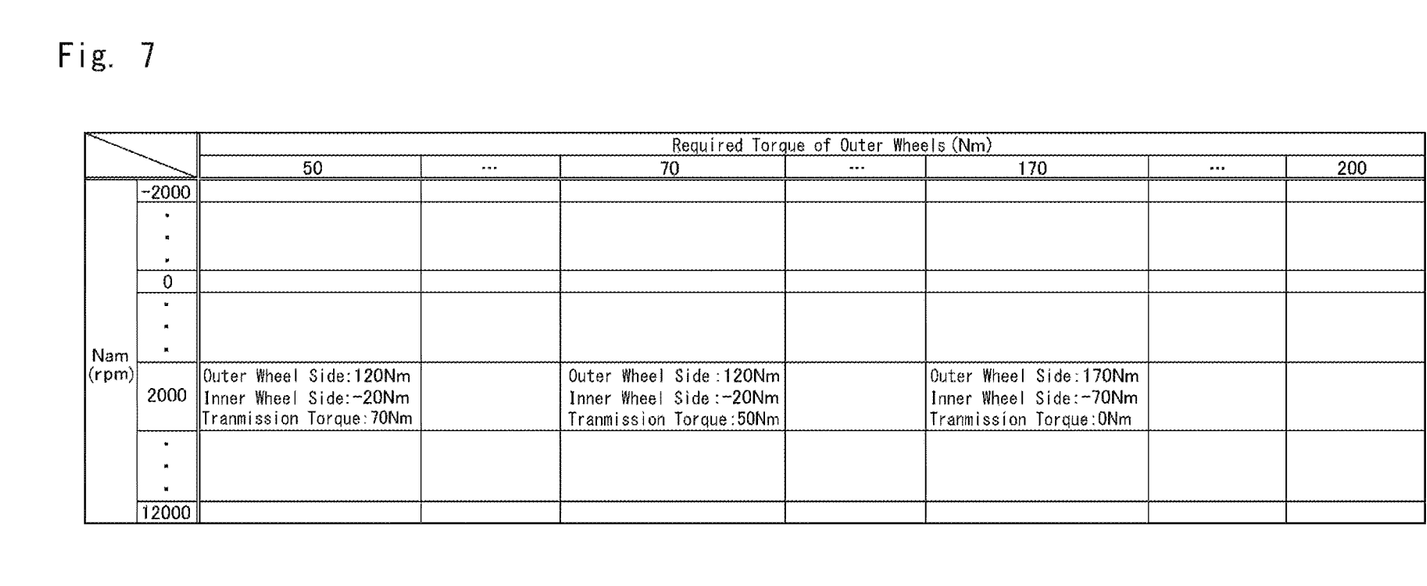
FIG. 7 shows a map used during turning of the vehicle.

FIG. 6 shows one example of the map used during straight running, and FIG. 7 shows one example of the map used during turning. In the map shown in FIG. 6, horizontal columns indicate the required torques $T_{req}$ of the first drive unit 1, and vertical columns indicate the rotational speeds $N_{am}$. The map used during turning is prepared for every required torques $T_{req}$ of the first drive unit 1. FIG. 7 shows a map used in the case that the required torque $T_{req}$ of the first drive unit 1 is 100 Nm, and in the map shown in FIG. 7, horizontal columns indicate the required torques of the outer wheel, and vertical columns indicate the rotational speeds $N_{am}$.

Figure 8:
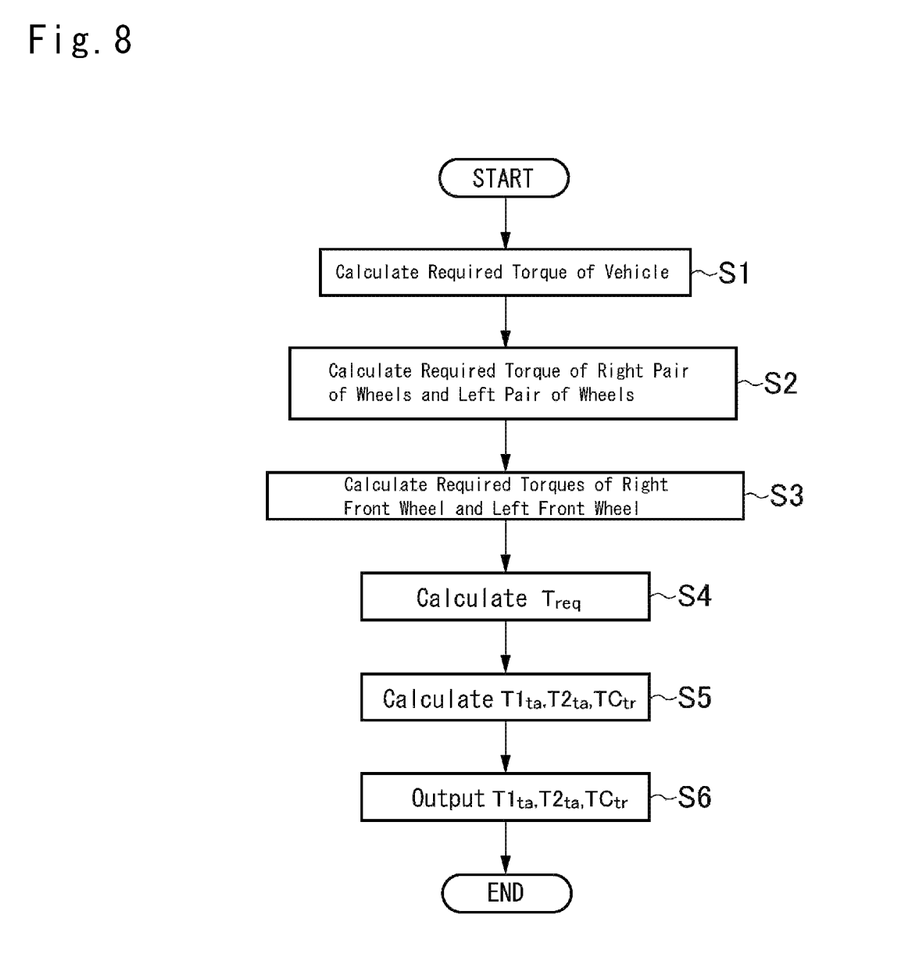
FIG. 8 is a flowchart showing an example of a routine executed by the drive force control system according to the embodiment.

FIG. 8 shows an example of a routine executed by the drive force control system according to the embodiment. At step S1, a required torque of the vehicle Ve is calculated based on a position of the accelerator pedal and a vehicle speed. Given that the vehicle is an autonomous vehicle that propels autonomously without requiring manual operations, the required torque may be calculated based on data collected by sensors such as a RADAR.

At step S2, a required torque of the left pair of wheels as a total torque of required torques of the left front wheel 11L and the left rear wheel 39L, and a required torque of the right pair of wheels as a total torque of required torques of the right front wheel 11R and the right rear wheel 39R, are calculated to improve running stability during turning based on the required torque of the vehicle Ve calculated at step S1. Such calculation at step S2 can be executed based on a conventionally known stability factor, and detailed explanation therefor will be omitted.

At step S3, required torques of the left front wheel 2L and the right front wheel 2R are calculated. At step S3, for example, 30 percent of the required torque of the left pair of wheels is allotted to the required torque of the left front wheel 2L, and 30 percent of the required torque of the right pair of wheels is allotted to the required torque of the right front wheel 2R. When accelerating the vehicle, a vertical force at the front pair of wheels is reduced, and a vertical force at the rear pair of wheels is increased. Therefore, torques of the front wheels are set to smaller values, and torques of the rear wheels are set to higher values. Details of such calculation at step S3 are described e.g., in JP-A-2015-253254.

At step S4, the required torque $T_{req}$ of the first drive unit 1 is calculated by adding the required torque of the left front wheel 2L to the required torque of the right front wheel 2R calculated at step S3.

At step S5, the target torque $T1_{ta}$ of the first motor 2R, the target torque $T2_{ta}$ of the second motor 2L, and the torque transmitting capacity $TC_{tr}$ of the clutch 22 are calculated based on the required torque $T_{req}$ of the first drive unit 1 or the required torques of the right front wheel 2R and the left front wheel 2L. Such calculations at step S5 may be executed not only by the above-explained procedure but also with reference to the maps.

At step S6, command signals are transmitted to the first motor 2R, the second motor 2L, and the clutch 22 to achieve the target torque $T1_{ta}$ of the first motor 2R, the target torque $T2_{ta}$ of the second motor 2L, and the torque transmitting capacity $TC_{tr}$ of the clutch 22. Thereafter; the routine is terminated.

Thus, the total efficiency X of the first drive unit 1 is calculated for every combination of the first interim torque $T1_{pr}$ and the second interim torque $T2_{pr}$ to achieve the required torque $T_{req}$. Then, the combination of the first interim torque $T1_{pr}$ and the second interim torque $T2_{pr}$ is selected in such a manner as to optimize the total efficiency X of the first drive unit 1. Thereafter, the first interim torque T1 and the second interim torque $T2_{pr}$ of such combination are employed as the target torque $T1_{ta}$ of the first motor 2R and the target torque $T2_{ta}$ of the second motor 2L. According to the embodiment, therefore, the first drive unit 1 will not output the torques excessively. Specifically, in the four-wheel drive vehicle shown in FIG. 2, the target torque $T1_{ta}$ of the first motor 2R and the target torque $T2_{ta}$ of the second motor 2L are set based on the required torques of the drive wheels 11R and 11L. In the vehicle shown in FIG. 2, therefore, direction of the torques of the front pair of wheels 11R and 11L and the rear pair of wheels 39R and 39L will not be outputted in opposite directions. That is, a slip amount of any of the wheels 11R, 11L, 39R, and 39L will not be increased. For this reason, damages on the wheels 11R, 11L, 39R, and 39L can be reduced, and a power loss between the wheel and a road surface can be reduced. In other words, a total efficiency of the vehicle Ve can be improved.

When the required torques of the drive wheels 11R and 11L are different during turning, the interim torque of one of the motors connected to the outer wheel requiring a larger torque is set to the greater value than the required torque of the outer wheel, and the torque transmitting capacity $TC_{tr}$ of the clutch 22 is calculated based on a difference between the required torque of the outer wheel and the interim torque of the motor connected to the outer wheel. According to the embodiment, therefore, the torques identical to the required torques of the drive wheels 11R and 11L can be outputted, and the efficiency of the first drive unit 1 can be improved even when required torques of the drive wheels 11R and 11L are different.

In addition, even if the specifications of the first motor 2R and the second motor 2L are different, the efficiency of the first drive unit 1 can be improved.

Although the above exemplary embodiments of the present application have been described, it will be understood by those skilled in the art that the present application should not be limited to the described exemplary embodiments, and various changes and modifications can be made within the spirit and scope of the present disclosure. For example, the target torque $T1_{ta}$ of the first motor 2R, the target torque $T2_{ta}$ of the second motor 2L, and the torque transmitting capacity $TC_{tr}$ of the clutch 22 may also be calculated after correcting the required torque $T_{req}$ of the first drive unit 1 taking account of a power loss resulting from a slip of the clutch 22.

What is claimed is:

1. A drive unit, comprising:
   a first motor connected to a right drive wheel;
   a second motor connected to a left drive wheel;
   a clutch that allows a torque transmission between the first motor and the second motor, in which a torque transmitting capacity is variable;

an electrical power source that supplies electric power to the first motor and the second motor; and a controller that controls output torques of the first motor and the second motor and a torque transmitting capacity of the clutch, the controller being configured to:
  calculate a total required torque of the drive unit;
  obtain a plurality of combinations of a first interim torque of the first motor and a second interim torque of the second motor to achieve the total required torque of the drive unit;
  select a combination of the first interim torque of the first motor and the second interim torque of the second motor to minimize an output electric power of the electrical power source;
  output the first interim torque of the first motor and the second interim torque of the second motor based on the selected combination;
  calculate a first required torque of the right drive wheel and a second required torque of the left drive wheel;
  when the first required torque is larger than the second required torque, calculate the torque transmitting capacity of the clutch by subtracting the first required torque from the first interim torque of the selected combination;
  when the second required torque is larger than the first required torque, calculate the torque transmitting capacity of the clutch by subtracting the second required torque from the second interim torque of the selected combination; and
  control the clutch in such a manner as to achieve the calculated torque transmitting capacity.

\* \* \* \* \*